(12) United States Patent
Yokota

(10) Patent No.: US 7,862,077 B2
(45) Date of Patent: Jan. 4, 2011

(54) SIDE-IMPACT AIRBAG AND SIDE-IMPACT AIRBAG APPARATUS

(75) Inventor: Masatoshi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 236 days.

(21) Appl. No.: 12/153,920

(22) Filed: May 28, 2008

(65) Prior Publication Data

US 2009/0039624 A1 Feb. 12, 2009

(30) Foreign Application Priority Data

Aug. 9, 2007 (JP) ............................. 2007-207691

(51) Int. Cl.
*B60R 21/16* (2006.01)
*B60R 21/207* (2006.01)

(52) U.S. Cl. .................. 280/730.2; 280/729; 280/743.1

(58) Field of Classification Search ................. 280/729, 280/730.2, 743.1
See application file for complete search history.

(56) References Cited

U.S. PATENT DOCUMENTS

| | | | | |
|---|---|---|---|---|
| 5,570,900 | A * | 11/1996 | Brown | 280/729 |
| 5,692,774 | A * | 12/1997 | Acker et al. | 280/729 |
| 5,803,485 | A * | 9/1998 | Acker et al. | 280/728.2 |
| 6,062,594 | A * | 5/2000 | Asano et al. | 280/730.2 |
| 6,341,797 | B1 * | 1/2002 | Seo | 280/730.2 |
| 6,561,539 | B1 * | 5/2003 | Sunabashiri et al. | 280/730.1 |
| 6,976,702 | B2 * | 12/2005 | Yokota et al. | 280/730.2 |
| 2006/0022441 | A1 * | 2/2006 | Hayashi et al. | 280/730.2 |
| 2007/0170707 | A1 * | 7/2007 | Sato et al. | 280/730.2 |
| 2007/0267854 | A1 * | 11/2007 | Fukuda et al. | 280/730.2 |
| 2007/0278771 | A1 * | 12/2007 | Sato et al. | 280/730.2 |
| 2007/0284858 | A1 * | 12/2007 | Nishimura et al. | 280/729 |
| 2007/0284859 | A1 * | 12/2007 | Kashiwagi | 280/730.2 |

FOREIGN PATENT DOCUMENTS

| | | |
|---|---|---|
| JP | 2000-289556 | 10/2000 |
| JP | 2001-114060 | 4/2001 |
| JP | 2005-186655 | 7/2005 |
| JP | 2005-225273 | 8/2005 |
| JP | 2005-225351 | 8/2005 |
| JP | 2006-008015 | 1/2006 |

* cited by examiner

*Primary Examiner*—Paul N. Dickson
*Assistant Examiner*—Joselynn Y. Sliteris
(74) *Attorney, Agent, or Firm*—Manabu Kanesaka

(57) ABSTRACT

A side-impact airbag is disposed in a space between a side wall portion of a vehicle and a seat. The side-impact airbag includes a plurality of chambers partitioned in the airbag, a communication passageway formed in a front region of the airbag in a front-and-back direction of the vehicle, and a tether disposed between two of the plurality of chambers located at a rear region of the airbag in the front-and-back direction. The communication passageway allows at least two of the plurality of chambers to communicate with each other at the front region. An inflator supplies the gas to expand the side-impact airbag. The gas from the inflator is lead toward the communication passage through one of the partitioned chambers.

5 Claims, 3 Drawing Sheets

SIDE-IMPACT AIRBAG AND SIDE-IMPACT AIRBAG APPARATUS

BACKGROUND OF THE INVENTION AND RELATED ART STATEMENT

Hitherto, a side-impact airbag apparatus, in which a side-impact airbag is expanded to a side portion of an occupant by means of an inflator and restrains a body of the occupant in a lateral collision of a vehicle such as an automobile or the like, or an overturn of a vehicle body, or the like is well known. The side-impact airbag apparatus is housed in, for example, a backrest portion of a seat, and in the lateral collision or the like, the side-impact airbag is expanded and developed from the backrest portion to a space between the occupant and a side wall portion of the vehicle body by a gas that is blown out from the inflator.

Further, a side-impact airbag having a tether therein for limiting a thickness of the airbag when in deployed state, to a predetermined thickness is also known in the conventional art. For example, refer to Japanese Unexamined Patent Application Publication No. 2005-225351 (Patent Document 1).

In the aforementioned conventional technology, a basic configuration of a side-impact airbag apparatus having the tether for limiting the thickness of the airbag when in the deployed state, to the predetermined thickness, and causing the airbag to be expanded in a space between an occupant and a side wall portion of a vehicle body in an emergency, is disclosed. For promoting optimum of the side-impact airbag apparatus having such a configuration, it is required to improve a forward expanding capability of the side-impact airbag at the time of expansion.

It is therefore an object of the present invention to solve the problems stated above and provide a side-impact airbag and a side-impact airbag apparatus capable of improving the forward developing capability at the time of deployment.

Further objects and advantages of the invention will be apparent from the following description of the invention.

SUMMARY OF THE INVENTION

In order to achieve the above-described object, an embodiment of the present invention provides a side-impact airbag including a plurality of partitioned chambers in an inner part thereof, and expanding in a space between a side wall portion of a vehicle body and an occupant seated in a seat disposed in an inner part of the vehicle body. The side-impact airbag, according to the embodiment of the present invention, includes a communication passageway for allowing at least two of the plurality of chambers to communicate with each other in a front region of the airbag in a front-and-back direction of the vehicle and a tether disposed between the chambers to lead gas from an inflator. The inflator supplies the gas required for expanding the side-impact airbag to the communication passageway to communicate with each other by partitioning the chambers in a back region of the airbag in the front-and-back direction of the vehicle.

In the above embodiment of the present invention, the side-impact airbag is housed in, for example, a backrest portion of a seat in a folded back manner, and is expanded and developed in a space between the occupant and the side wall portion of the vehicle body by a gas blown out from the inflator, in a lateral collision of the vehicle, or an overturn of the vehicle body or the like.

Further, in the above embodiment, the side-impact airbag is provided with the plurality of chambers, and at least two of the plurality of chambers are allowed to communicate with each other through the continuous passageway in the front region of the airbag in the front-and-back direction of the vehicle, and the tether is disposed between the chambers to partition the chambers in the back region of the airbag in the front-and-back direction of the vehicle. Thereby, the gas blown into a predetermined chamber from the inflator can be led to the front region of the airbag by the tether partitioning the chambers, and caused to flow into the other chamber that is allowed to communicate therewith through the communication passageway. As described above, by leading the blowing-out gas to the front region of the airbag first, at the time of activation of the inflator, the side-impact airbag can be developed forward first, and thereafter the same can be developed in the other direction (upside, downside, or the like). Accordingly, a forward developing capability of the side-impact airbag at the time of deployment can be improved. As a result, the side-impact airbag becomes capable of being expanded and developed in the space between the occupant and the side wall portion of the vehicle body by priority, and hence safety of the occupant can be improved.

In addition, there is also an advantage in which the thickness of the chamber at the time of development can be set to a desired thickness by using the tether for partitioning the chamber.

The side-impact airbag is constructed to have, for example, an upper chamber for limiting a movement of a breast portion of the occupant and a lower chamber for limiting a movement of a waist portion of the occupant in an inner part thereof, although the blowing-out gas of the inflator is generally blown out to the lower chamber by priority, when the lower chamber is thereby expanded earlier than the upper chamber, the lower chamber is sometimes raised up due to being stretched upward by the upper chamber. As a result, there has been a case that the lower chamber is difficult to be smoothly developed between the occupant and the vehicle body. In contrast, according to the embodiment of the present invention, since the gas blown into the upper chamber is led to the front region of the airbag by the tether, the upper chamber can be rapidly developed to the front region of the airbag. Thereby, the upper chamber and the lower chamber can approximately be simultaneously developed to the front region of the airbag, and the lower chamber can be prevented from being raised up. As a result, the lower chamber can be smoothly developed between the occupant and the vehicle body.

According to another embodiment of the present invention, the side-impact airbag further includes an upper chamber disposed in an upper region of the airbag and a lower chamber disposed in a lower region of the airbag in an inner part thereof, and the communication passageway allows the upper chamber and the lower chamber to communicate with each other in the front region of the airbag, and the tether is disposed between the upper chamber and the lower chamber to partition the upper chamber and the lower chamber in the back region of the airbag.

Accordingly, the gas can be blown out into the lower chamber at the time of activation of the inflator and the blown-out gas can be led to the front region of the airbag by the tether partitioning the chambers, and caused to flow into the upper chamber being allowed to communicate with the lower chamber via the communication passageway. As a result, the lower chamber can be developed to the front region of the airbag first, and thereafter the upper chamber can be developed to the upper region of the airbag. Accordingly, the forward developing capability of the side-impact airbag at the time of expansion and development can be improved.

According to another embodiment of the present invention, the side-impact airbag further includes a middle chamber disposed between the upper chamber and the lower chamber, and the communication passageway allows the upper chamber and the middle chamber to communicate with each other in the front region of the airbag, and the tether is disposed between the upper chamber and the middle chamber to partition the upper chamber and the middle chamber in the back region of the airbag.

Accordingly, the gas can be blown into the lower chamber and the middle chamber at the time of activation of the inflator, and the gas blown into the middle chamber can be led to the front region of the airbag by the tether partitioning the upper chamber and the middle chamber, and caused to flow into the upper chamber being allowed to communicate therewith via the communication passageway. Therefore, the lower chamber can be developed to the lower region of the airbag and the middle chamber can be developed to the front region of the airbag first, and thereafter the upper chamber can be developed to the upper region of the airbag. Accordingly, the forward developing capability of the side-impact airbag at the time of deployment can be improved.

According to another embodiment of the present invention, a non-expansion portion is provided between a front end portion of the tether and the communication passageway. The gas blown out from the inflator into the predetermined chamber in the plurality of chambers can be led to the front region of the airbag by the tether partitioning the chambers, and the gas can be caused to flow into the other chambers in a manner so as to go around the non-expansion portion via the communication passageway. As a result, the blown-out gas of the inflator can be caused to flow into the other chamber via the communication passageway upon sufficiently introducing the blowing-out gas of the inflator to an end portion of the front region of the airbag. Accordingly, the forward developing capability of the side-impact airbag at the time of deployment can further be improved. Further, by forming the non-expansion portion at a portion where no specific thickness is necessary (a portion where the body of the occupant does not contact) at the time of deployment, the flow volume of the gas required to develop the airbag is saved, or in which a developing speed is accelerated, can be obtained.

According to another embodiment of the present invention, a side-impact airbag apparatus includes the side-impact airbag, an inflator disposed in the back region of the side-impact airbag in the front-and-back direction of the vehicle to supply the gas for expanding the side-impact airbag, and a casing for housing the side-impact airbag and the inflator. The side-impact airbag is housed in a folded back manner in the casing embedded in, for example, a backrest portion of a seat, and is expanded from the casing by the gas blown out from the inflator at the time of the lateral collision of the vehicle or the overturn of the vehicle body or the like, and is expanded and developed in the space between the occupant and the side wall portion of the vehicle body.

The side-impact airbag is provided with a plurality of chambers, and at least two of the plurality of chambers are allowed to communicate with each other by the communication passageway in the front region of the airbag in the front-and-back direction of the vehicle, and the tether is disposed between the chambers to partition the chambers in the back region of the airbag in the front-and-back direction of the vehicle. Therefore, the gas blown out from the inflator into the predetermined chamber among the plurality of chambers can be led to the front region of the airbag by the tether partitioning the chambers, and caused to flow into the other chambers being allowed to communicate via the communication passageway.

As described above, by leading the blowing-out gas to the front region of the airbag first, when the inflator is activated, the side-impact airbag can be developed forward first, and thereafter the same can be developed in the other directions (upside, downside, or the like). Accordingly, the forward developing capability of the side-impact airbag at the time of deployment can be improved. As a result, the side-impact airbag becomes capable of being expanded and developed in the space between the occupant and the side wall portion of the vehicle by priority, and safety of the occupant can be improved.

DETAILED DESCRIPTION OF THE PREFERRED EMBODIMENTS

Figure 1:
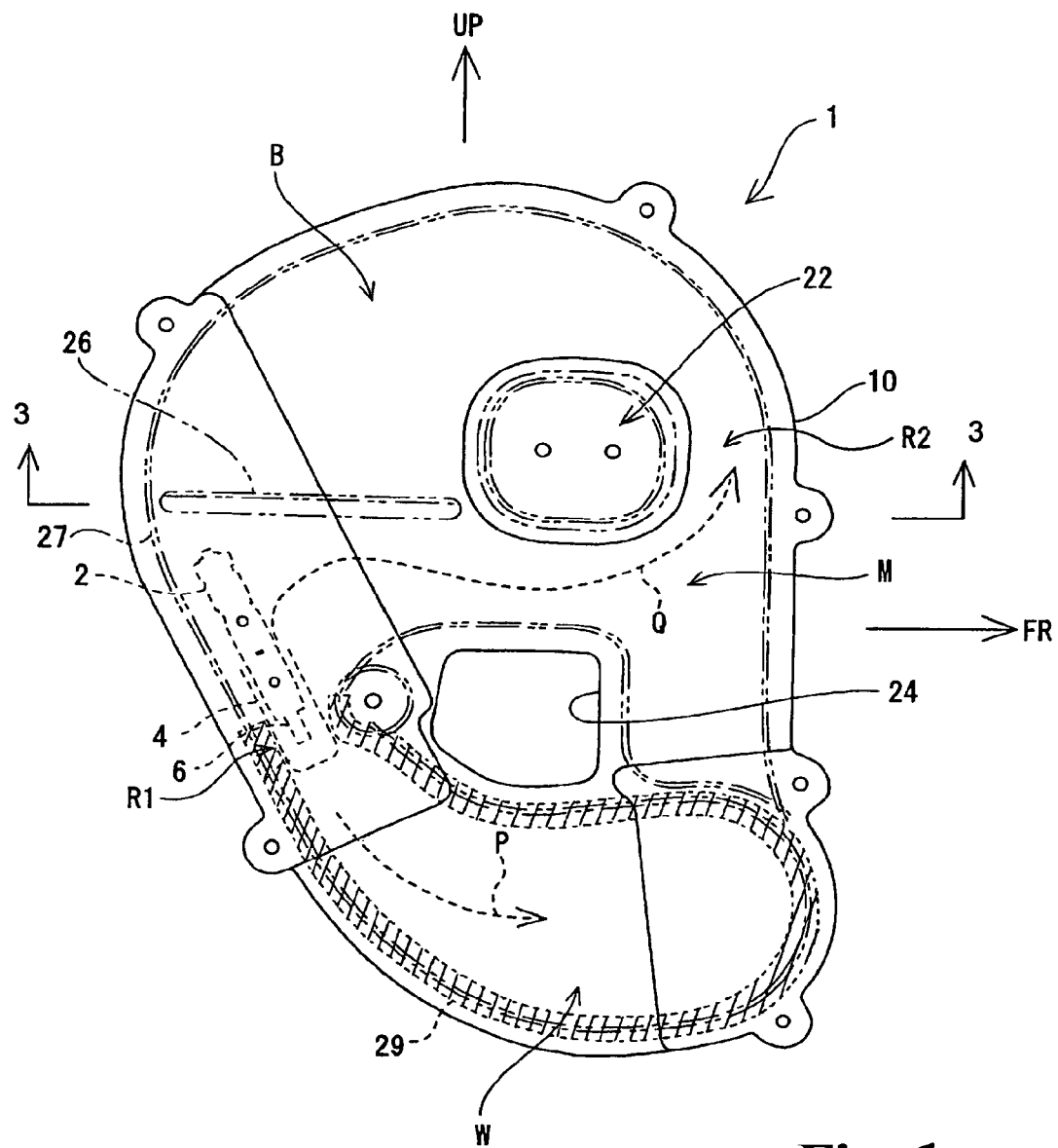
FIG. 1 shows a development plan view illustrating a side-impact airbag of an embodiment of the present invention.
Figure 2:
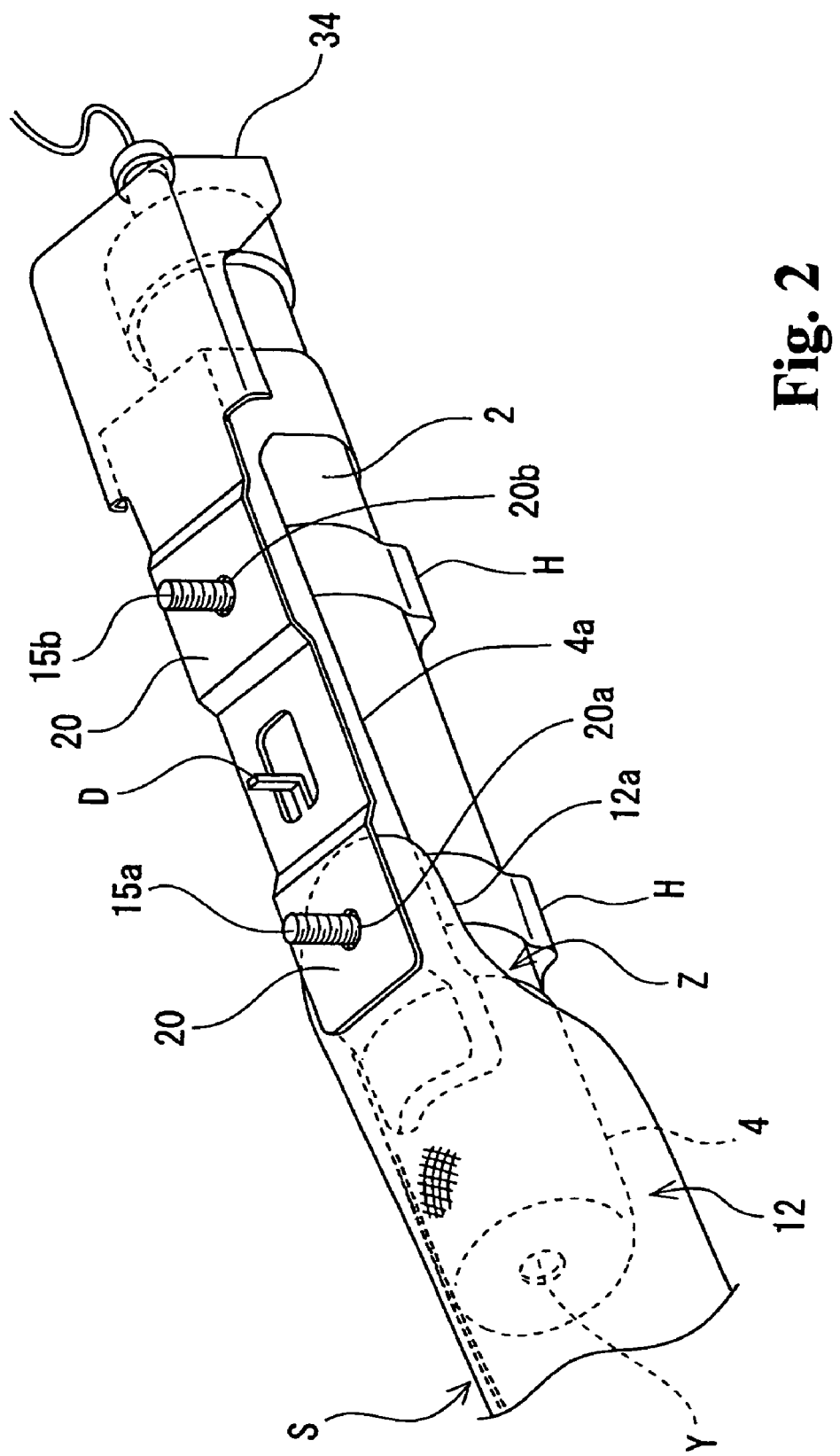
FIG. 2 shows an entire perspective view illustrating an inflator for expanding and developing the side-impact airbag.
Figure 3:
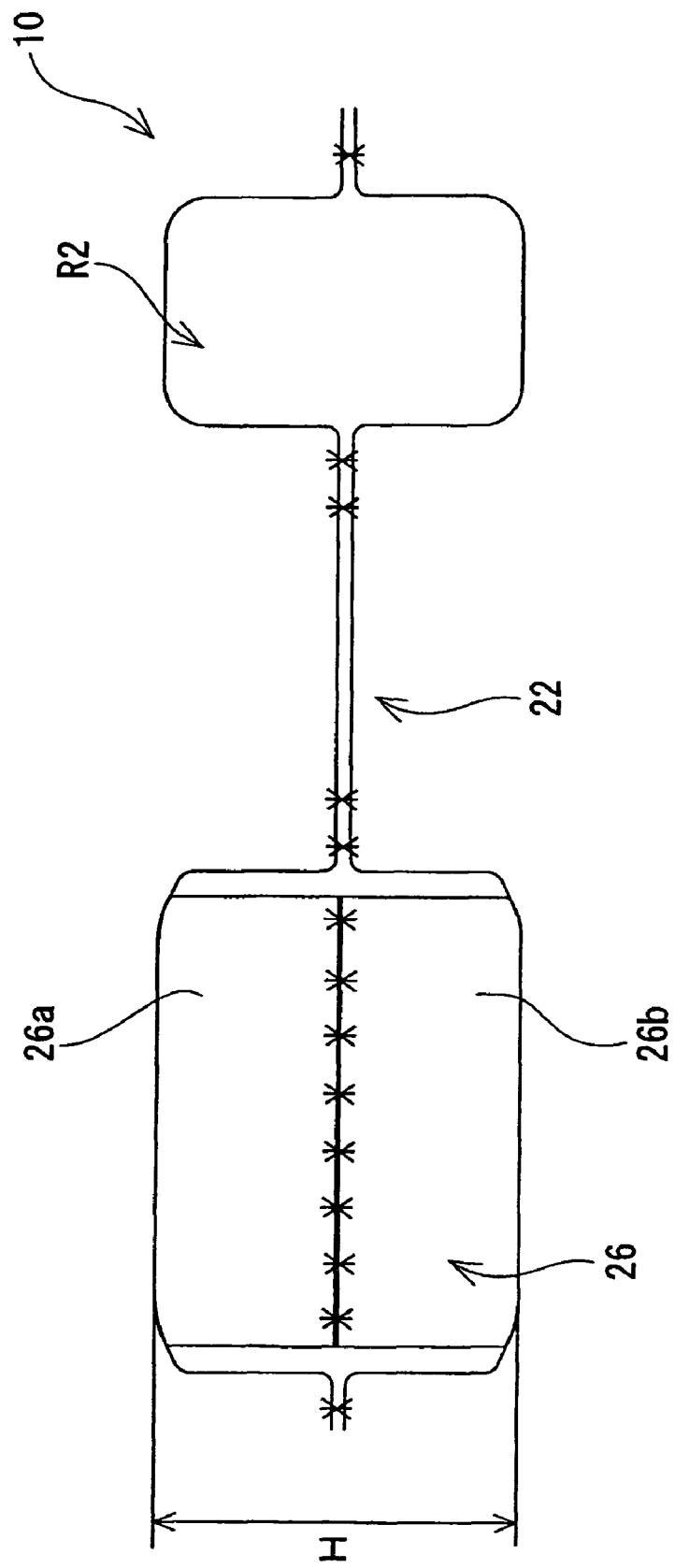
FIG. 3 is a cross-sectional view taken along line 3-3 in FIG. 1.

Now, preferred embodiments of the present invention will be explained with reference to the drawings. FIG. 1 is a development plan view illustrating a side-impact airbag of the present embodiment, FIG. 2 is an entire perspective view illustrating an inflator for expanding and developing the side-impact air bag, and FIG. 3 is a cross-sectional view taken along line 3-3 in FIG. 1 when the side-impact airbag of embodiment of the present invention is expanded and developed.

Incidentally, in FIG. 1, an arrow FR indicates a front side of a vehicle, and an arrow UP indicates an upper direction of the vehicle.

A side-impact airbag apparatus 1 is provided with a bag-shaped side-impact airbag 10, an inflator 2 for supplying a gas for expanding and developing (deploying) the aforementioned side-impact airbag 10, and a casing C (not illustrated) being provided in a backrest portion of a seat disposed in a vehicle interior, and housing the aforementioned side-impact airbag 10 and the inflator 2.

As illustrated in FIG. 1, the aforementioned side-impact airbag 10 is constructed as a bag-shaped body by base cloths being formed into approximately the same shape, which are stitched and combined across an entire periphery along an outer edge portion of the base cloth. A reference numeral 27 in FIG. 1 denotes a stitching combination portion of the base cloth, and all the stitching combination portions along the outer edge portion of the bag-shaped body are formed to have double stitch lines (incidentally, the stitching combination portion is not always necessary to be formed to have double stitch lines, but a single stitch line).

An inner part of the side-impact airbag 10 is provided with a chamber B for a breast portion for limiting a movement of a breast portion (including a shoulder portion) of an occupant, which is disposed in an upper region of the airbag, a chamber W for a waist portion for limiting a movement of a waist portion of the occupant, which is disposed in a lower region of the airbag, and a middle chamber M positioned in the middle of both of the chamber W and the chamber B, and partitioned by the aforementioned chamber B for the breast portion, a tether cloth 26 (tether), and a non-expansion portion 22. Further, in a communication passageway R1 for allowing the aforementioned middle chamber M to communicate with the chamber W for the waist portion, the inflator 2 is mounted in a manner such that a convex portion 6 for blowing out the gas faces a side of the chamber W for the waist portion.

Furthermore, an opening 24 that penetrates the airbag in a vehicle-width direction (in a direction perpendicular to FIG. 1) is formed between the chamber W and the middle chamber M for the waist portion of the aforementioned side-impact airbag 10. In such a construction as described above, when the inflator 2 is activated, the gas, that is adjusted to a predetermined flow volume, flows into the chamber W for the waist portion from the convex portion 6 through a gas-flowing out hole Y (refer to FIG. 2 described later) of a sleeve 4 (refer to a dashed arrow P in FIG. 1). In addition, the gas that is adjusted to the predetermined flow volume is led from the convex portion 6 to the front region of the airbag by the tether cloth 26 in the middle chamber M through a flow path Z of the sleeve 4 (refer to FIG. 2). Then, the gas that is adjusted to the predetermined flow volume flows into the chamber B for the breast portion through a communication passageway R2 that allows the middle chamber M to communicate with the chamber B for the breast portion (refer to a dashed arrow Q in FIG. 1).

Incidentally, in the aforementioned stitching combination portion 27, at a part constructing an outer edge of the chamber W for the waist portion, a sealing member portion 29 formed of an appropriate sealing material such as silicon rubber or the like is provided along the stitching combination portion 27 for sealing the stitching combination portion 27. The sealing member portion 29 is formed to have a width wider than that of the stitching combination portion 27 having the double stitch lines (refer to FIG. 1) so that the sealing member portion 29 can seal over both of the double stitch lines of the stitching combination portion 27. Therefore, airtightness of the chamber W for the waist portion can be improved, and the pressure in the chamber W for the waist portion for limiting the movement of the waist portion of the occupant can be maintained at a high pressure for a relatively long time.

As illustrated in FIG. 2, at one side in the longitudinal direction of the aforementioned inflator 2, which is a gas-blowing out side, the tubular sleeve 4 disposed in a covering manner over the aforementioned convex portion 6 is provided (refer to the left side in FIG. 2), and further, a tubular base cloth member 12 is provided in a covering manner over the sleeve 4.

In the aforementioned tubular sleeve 4, the gas-flowing out hole Y is formed at a tip end thereof in a manner so as to face the aforementioned convex portion 6 of the inflator 2. A flow volume of the blowing-out gas is squeezed by the gas-flowing out hole Y, and a volume of the gas flowing into the chamber W for the waist portion is adjusted. On the other hand, the blowing-out gas at the flow volume squeezed by the aforementioned gas-flowing out hole Y flows out from the flow path (circular gap) Z formed by means of an outer periphery of the one side in the longitudinal direction of a body of the inflator 2 and an opening end edge of the other side of the aforementioned sleeve 4 (right side in FIG. 2) having a diameter larger than the outer periphery, and flows into the middle chamber M. Currently, an outer peripheral surface of the sleeve 4 and the sealing member portion 29 at a part of the communication passageway R1 are in approximately close contact with each other, and are configured for the blowing-out gas not to leak out from the gaps therebetween. By thus constructing, a flow volume of the gas flowing into a side of the chamber W for the waist portion from the inflator 2 and that flowing into a side of the middle chamber M (and a side of the chamber B for the breast portion) is distributed at an appropriate rate by the sleeve 4.

The aforementioned tubular base cloth member 12 is formed to have an approximately cylindrical shape by stitching the side edges of the flat shaped base cloth facing each other by a stitching portion S, and is provided with a one-way valve function for preventing the gas from flowing back from the side of the chamber W for the waist portion to the side of the middle chamber M when the airbag is developed. The tubular base cloth member 12 is provided with a latching piece 12a extended along the longitudinal direction of the inflator 12 at an end portion of the other side thereof (right side in FIG. 2). A latching hole (not illustrated) is provided in the latching piece 12a, and a bolt 15a, at the gas-blowing out side of the inflator 2, among the bolts 15a and 15b of a pair of supporting members H that are disposed at respective front and back sides of the aforementioned inflator 2 is inserted and latched in the latching hole. In this condition, the bolt 15a is inserted and latched in a latching hole 20a and a stopper plate 20 is overlapped thereupon. Thereby, the latching piece 12a of the tubular base cloth member 12 is sandwiched by a supporting portion 4a of the aforementioned sleeve 4 and the stopper plate 20.

The aforementioned stopper plate 20 is provided with a limiting portion 34 folded back in a covering manner over a part of an end portion of the inflator 2 at a side opposite to the gas-blowing out side of the inflator 2 (right side in FIG. 2), the latching holes 20a and 20b that are respectively formed at positions corresponding to the aforementioned bolts 15a and 15b, and a projecting portion D formed by cutting and raising at a middle portion between the two latching holes 20a and 20b.

The aforementioned limiting portion 34 of the stopper plate 20 prevents the inflator 2 from moving toward a side opposite to the gas-blowing out direction due to a kickback of the gas when being blown out. Further, the projecting portion D is made to be confirmed from outside via a projecting-portion-confirmation-hole (not illustrated) formed in the casing C when the side-impact airbag 10 is folded back and housed in the casing C, and is for preventing the stopper plate 20 from being forgotten to be attached.

The tether cloth 26 is a belt-shaped base cloth member constructed by a material equivalent to a base cloth used in constructing the side-impact airbag 10. In the present embodiment, as illustrated in FIG. 3, the tether cloth 26 is constructed as a sheet of a belt-shaped base cloth member by combining of a stitching operation two cloth pieces 26a and 26b. Incidentally, the tether cloth 26 may be constructed by one sheet of the cloth piece. Furthermore, the tether cloth 26 is provided in a manner so as to partition the chamber B for the breast portion and the middle chamber M of the side-impact airbag 10 in a lower region thereof (left side in FIG. 3) in a front-and-back direction of the vehicle by respectively stitching both ends in the width direction (up-and-down direction in FIG. 3) thereof to the base cloth constructing the side-impact airbag 10.

Thereby, the chamber B for the breast portion and the middle chamber M are partitioned by the tether cloth 26 and the non-expanding portion 22, and the thickness of the side-impact airbag 10 at the time of development can be set to a desired thickness H by the tether cloth 26. Incidentally, as illustrated in FIG. 3, the chamber B for the breast portion and the middle chamber M are not completely isolated, and a slight gap for allowing both of the chambers B and M to communicate with each other is provided at both end sides of the tether cloth 26 in the front-and-back direction (in the left-and-right direction in FIG. 3) of the vehicle. Thus, the chambers B and M are not in a state of being entirely partitioned.

Next, operation and advantages of the present embodiment having the construction as described above will be explained. As described above, in the present embodiment, the side-impact airbag 10 is folded back and housed in the casing C provided in the backrest portion of the seat, and is expanded and developed in a space between the occupant and the side wall portion of the vehicle body by the gas that is blown out from the inflator 2 in a lateral collision of the vehicle, or an overturn of the vehicle body or the like.

Currently, the side-impact airbag 10 is provided with the three chambers B, M, and W as described above, and the two chambers B and M in those three are allowed to communicate with each other by the communication passageway R2 in the front region of the airbag in the front-and-back direction of the vehicle and are partitioned by the tether cloth 26 in the back region of the airbag in the front-and-back direction of the vehicle.

Thereby, the gas that is blown out from the inflator 2 into the middle chamber M can be led to the front region of the airbag by the tether cloth 26, and caused to flow into the chamber B for the breast portion, which is allowed to communicate with the middle chamber M via the communication passageway R2. As described above, by leading the blowing-out gas to the front region of the airbag first, when the inflator 2 is activated, the side-impact airbag 10 can be developed forward first, and thereafter the same can be developed in the other direction (upward in the present embodiment). Accordingly, a forward developing capability of the side-impact airbag 10 at the time of expansion and development can be improved. As a result, the side-impact airbag 10 becomes capable of being expanded and developed in the space between the occupant and a door-inside portion of the vehicle by priority, and hence safety of the occupant can be improved.

In addition, there is also an advantage in which the thicknesses of the aforementioned chambers B and M at the time of development can be set to a desired thickness H by using the tether cloth 26 for partitioning the chambers B and M (refer to FIG. 3).

Further, as described in the present embodiment, in a case that the blowing-out gas of the inflator 2 is caused to blow out to the chamber W for the waist portion by priority, there is sometimes a case that the chamber W for the waist portion is expanded earlier than the middle chamber M, and the chamber W for the waist portion is raised up due to being stretched upward by the middle chamber M. In such a case, sometimes the chamber W for the waist portion is difficult to smoothly develop in the space between the occupant and the vehicle body. In contrast, according to the present embodiment, since the gas that has flowed into the middle chamber M is led to the front region of the airbag by the tether cloth 26, the middle chamber M can be rapidly developed to the front region of the airbag. Thereby, the middle chamber M and the chamber W for the waist portion can approximately be simultaneously developed to the front region of the airbag, and the chamber W for the waist portion can be prevented from being raised up. As a result, the chamber W for the waist portion can be smoothly developed in the space between the occupant and the vehicle body.

Furthermore, in the present embodiment, specifically, the non-expansion portion 22 is provided between a front end portion of the tether cloth 26 and the communication passageway R2. Thereby, the gas that is blown out from the inflator 2 into the middle chamber M can be led to the front region of the airbag by the tether cloth 26 partitioning the chambers B and M, and the gas can be caused to flow into the chamber B for the breast portion in a manner so as to go around the non-expansion portion 22 via the communication passageway R2. Moreover, the gas can be caused to flow into the chamber B for the breast portion upon sufficiently introducing the blowing-out gas of the inflator 2 to an end portion of the front region of the side-impact airbag 10. Accordingly, the forward developing capability of the side-impact airbag 10 at the time of expansion and development can further be improved. Further, by forming the non-expansion portion at a portion where no specific thickness is necessary (a portion where the body of the occupant does not contact the side-impact airbag 10) at the time of expansion and development, advantages, in which the flow volume of the gas required to develop the side-impact airbag 10 is saved, or in which a developing speed is accelerated, can be obtained.

Incidentally, although the side-impact airbag 10 having a three-chamber structure is explained in the aforementioned embodiment, the side-impact airbag 10 can also be constructed with a two-chamber structure. That is, this kind of side-impact airbag (not illustrated) is provided with two chambers in an inner part thereof, namely an upper chamber (chamber B for the breast portion) and a lower chamber (chamber W for the waist portion) disposed in a lower region of the airbag, and the communication passageway R2 allows the chamber B for the breast portion and the chamber W for the waist portion to communicate with each other in the front region of the airbag, and the tether cloth 26 is disposed between the chambers B and W in a manner so as to partition the chamber B for the breast portion and the chamber W for the waist portion in the back region of the airbag.

Therefore, the gas can be blown out into the chamber W for the waist portion when the inflator 2 is activated, and the blown-out gas can be led to the front region of the airbag by the tether cloth 26 that partitions the chambers, and caused to flow into the chamber B for the breast portion that is allowed to communicate with the chamber W for the waist portion via the communication passageway R2. As a result, the chamber W for the waist portion can be developed to the front region of the airbag first, and thereafter the chamber B for the breast portion can be developed to the upper region of the airbag. Accordingly, the forward developing capability of the side-impact airbag 10 at the time of expansion and development can be improved.

The disclosure of Japanese Patent Application No. 2007-207691 filed on Aug. 9, 2007 is incorporated herein as a reference.

While the invention has been explained with reference to the specific embodiments of the invention, the explanation is illustrative, and the invention is limited by the appended claims.

What is claimed is:

1. A side-impact airbag to be disposed in a space between a side wall portion of a vehicle and a seat, comprising:
   base cloths forming a bag-shaped airbag,
   a plurality of chambers partitioned in the airbag, said plurality of chambers comprising an upper chamber disposed in an upper region of the airbag, a middle chamber disposed under the upper chamber, and a lower chamber disposed under the middle chamber,
   a first communication passageway situated between the middle chamber and the lower chamber at a rear region of the airbag in a front-and-back direction of the vehicle, said lower chamber being completely sealed so that a gas for inflating the lower chamber is supplied only through the first communication passageway, a second communication passageway formed in a front region of the airbag in the front-and-back direction of the vehicle, said second communication passageway allowing the upper and middle chambers to communicate with each other at the front region, a tether disposed between the upper and middle chambers located at the rear region of the airbag in the front-and-back direction, and a non-expansion portion formed by joining the base cloths together and situated between the upper and middle chambers adjacent the tether to define the second communication passageway at a side opposite to the tether so that the gas supplied at the rear region is substantially led to the upper chamber through the middle chamber and the second communication passageway.

2. The side-impact airbag according to claim 1, further comprising another non-expansion portion between the middle chamber and the lower chamber at a side of the first communication passageway.

3. A side-impact airbag apparatus comprising:

the side-impact airbag according to claim 1; and an inflator disposed in the rear region of the airbag for supplying the gas to the airbag.

4. The side-impact airbag according to claim 1, wherein said tether is located between an edge of the air bag and the non-expandable portion with spaces relative to the edge and the non-expandable portion.

5. The side-impact airbag according to claim 1, further comprising a sealing member formed around the lower chamber where the base cloths are connected, to completely seal the lower chamber.

* * * * *